(12) United States Patent
Dewey et al.

(10) Patent No.: US 9,864,646 B2
(45) Date of Patent: *Jan. 9, 2018

(54) MANAGING SPACES IN MEMORY

(71) Applicant: International Business Machines Corporation, Armonk, NY (US)

(72) Inventors: Douglas W. Dewey, Longmont, CO (US); Kevin S. Goldsmith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,142

(22) Filed: Nov. 14, 2016

(65) Prior Publication Data

US 2017/0060662 A1    Mar. 2, 2017

Related U.S. Application Data

(63) Continuation of application No. 15/093,790, filed on Apr. 8, 2016, now Pat. No. 9,542,257, which is a
(Continued)

(51) Int. Cl.
*G06F 12/00*    (2006.01)
*G06F 11/07*    (2006.01)
(Continued)

(52) U.S. Cl.
CPC ........ *G06F 11/0763* (2013.01); *G06F 3/0604* (2013.01); *G06F 3/067* (2013.01);
(Continued)

(58) Field of Classification Search
CPC .... G06F 3/0604; G06F 3/0619; G06F 3/0631; G06F 3/067; G06F 3/0659; G06F 3/0683;
(Continued)

(56) References Cited

U.S. PATENT DOCUMENTS 7,107,430 B2   9/2006 Grossman et al.
7,233,335 B2   6/2007 Moreton et al.
(Continued)

OTHER PUBLICATIONS

Nagarakatte, S., et al., "Watchdog: Hardware for Safe and Secure Manual Memory Management and Full Memory Saftey," 39th International Symposium on Computer Architecture, Jun. 2012. 13 Pages DOI: 10.1109/ISCA.2012.6237017.
(Continued)

*Primary Examiner* — Kalpit Parikh
(74) *Attorney, Agent, or Firm* — Peter J. Edwards

(57) ABSTRACT

A method of and system for managing spaces in memory of a storage facility is disclosed. The method and system includes storing first and second identifiers in first and second spaces in memory in response to allocating the second space for a set of data. The first identifier is stored in a first field within the first space. The first space has a pointer in a second field. The pointer in the second field indicates an address of the second space. The second identifier is stored within a portion of the second space. In response to an error event, the first and second identifiers may be captured. A determination is made as to whether the pointer is directed to the set of data. The determination is based on a comparison of the first identifier and the second identifier.

1 Claim, 5 Drawing Sheets

Related U.S. Application Data continuation of application No. 14/168,066, filed on Jan. 30, 2014.

(51) Int. Cl.
  *G06F 3/06* (2006.01)
  *G06F 12/02* (2006.01)
(52) U.S. Cl.
  CPC .......... *G06F 3/0619* (2013.01); *G06F 3/0631* (2013.01); *G06F 3/0644* (2013.01); *G06F 3/0659* (2013.01); *G06F 3/0665* (2013.01); *G06F 3/0683* (2013.01); *G06F 11/073* (2013.01); *G06F 11/079* (2013.01); *G06F 11/0709* (2013.01); *G06F 11/0727* (2013.01); *G06F 11/0751* (2013.01); *G06F 11/0778* (2013.01); *G06F 12/0238* (2013.01); *G06F 2201/815* (2013.01); *G06F 2201/835* (2013.01); *G06F 2212/1032* (2013.01); *G06F 2212/152* (2013.01); *G06F 2212/154* (2013.01); *G06F 2212/263* (2013.01); *G06F 2212/657* (2013.01)
(58) Field of Classification Search
  CPC .. G06F 3/0644; G06F 3/0665; G06F 11/0727; G06F 11/0709; G06F 11/0763; G06F 11/0751; G06F 11/0778; G06F 11/073; G06F 12/0238; G06F 2212/0132; G06F 2212/152; G06F 2212/154; G06F 2212/263; G06F 2212/657; G06F 2201/815; G06F 2201/835

See application file for complete search history.

(56) References Cited

U.S. PATENT DOCUMENTS

| | | |
|---|---|---|
| 8,073,673 B2 | 12/2011 | Bishop et al. |
| 9,117,502 B2 | 8/2015 | Hughes et al. |
| 2005/0125625 A1 | 6/2005 | Kilian et al. |
| 2008/0209264 A1 | 8/2008 | Morse et al. |
| 2014/0372726 A1 | 12/2014 | Koo et al. |
| 2015/0212740 A1 | 7/2015 | Dewey et al. |
| 2016/0210184 A1 | 7/2016 | Dewey et al. |

OTHER PUBLICATIONS

Younan, Y. et al., "PAriCheck: An Efficient Pointer Arithmetic Checker for C Programs," ASIACCS '10 Proceedings of the 5th ACM Symposium on Information, Computer and Communications Security, 19 Pages. ACM New York, NY, USA © 2010 DOI: 10.1145/1755688.1755707.

U.S. Appl. No. 15/093,790, Accelerated Examination Support Document, Dated Apr. 5, 2016, 18 pages.

Dewey et al., "Managing Spaces in Memory", U.S. Appl. No. 15/350,137, filed Nov. 14, 2016.

U.S. Appl. No. 15/350,137, Accelerated Examination Support Document, Dated Nov. 10, 2016, 19 pages.

Doudalis et al., "Effective and Efficient Memory Protection Using Dynamic Tainting," IEEE Transactions on Computers, vol. 61, No. 1, pp. 87-100. Jan. 2012. DOI: 10.1109/TC.2010.215.

MANAGING SPACES IN MEMORY

TECHNICAL FIELD

This disclosure relates generally to computer systems and, more particularly, relates to managing spaces in memory of a storage system.

BACKGROUND

The amount of data that needs to be managed by enterprises is growing at an extremely high rate. Management of storage environments may need to be performed with as few errors as possible. Diagnostic information associated with an error event may be gathered. The diagnostic information may be utilized in an attempt to determine a cause of the error event. For example, a user may examine diagnostic information such as system records for data related to the error event. Error events may lead to integrity problems, application outages, or expend resources. As such, significant costs may be associated with error events. As data needing to be managed increases, the need for management efficiency may increase.

SUMMARY

Aspects of the disclosure include a method and system for managing spaces in memory of a storage facility (i.e., storage system). The method and system includes storing first and second identifiers in first and second spaces in memory in response to allocating the second space for a set of data. The first identifier is stored in a first field within the first space. The first space has a pointer in a second field. The pointer in the second field indicates an address of the second space. The second identifier is stored within a portion of the second space. Data may be overwritten on reuse of the memory which may occur zero or more times. In response to an error event, the first and second identifiers may be captured. A determination may be made as to whether the pointer is directed to the set of data. The determination can be based on a comparison of the first identifier and the second identifier.

Aspects of the disclosure include the first and second identifiers stored in the first and second spaces in memory being a same unique identifier. In embodiments, the first and second identifiers may be one precision timestamp related to one allocated set of data. In embodiments, the first and second identifiers may be one sequentially serialized value related to one allocated set of data. In embodiments, the second identifier may be included in a header. The header may have at least one of an eyecatcher, a version number, or a linkage. In embodiments, the first and second identifiers may be generated by a memory manager. In embodiments, the first and second identifiers may be generated by an application configured to selectively manage memory. Aspects of the disclosure may improve accuracy and timeliness in diagnosing causes of error events and provide benefits related to management efficiency.

DETAILED DESCRIPTION

Figure 1:
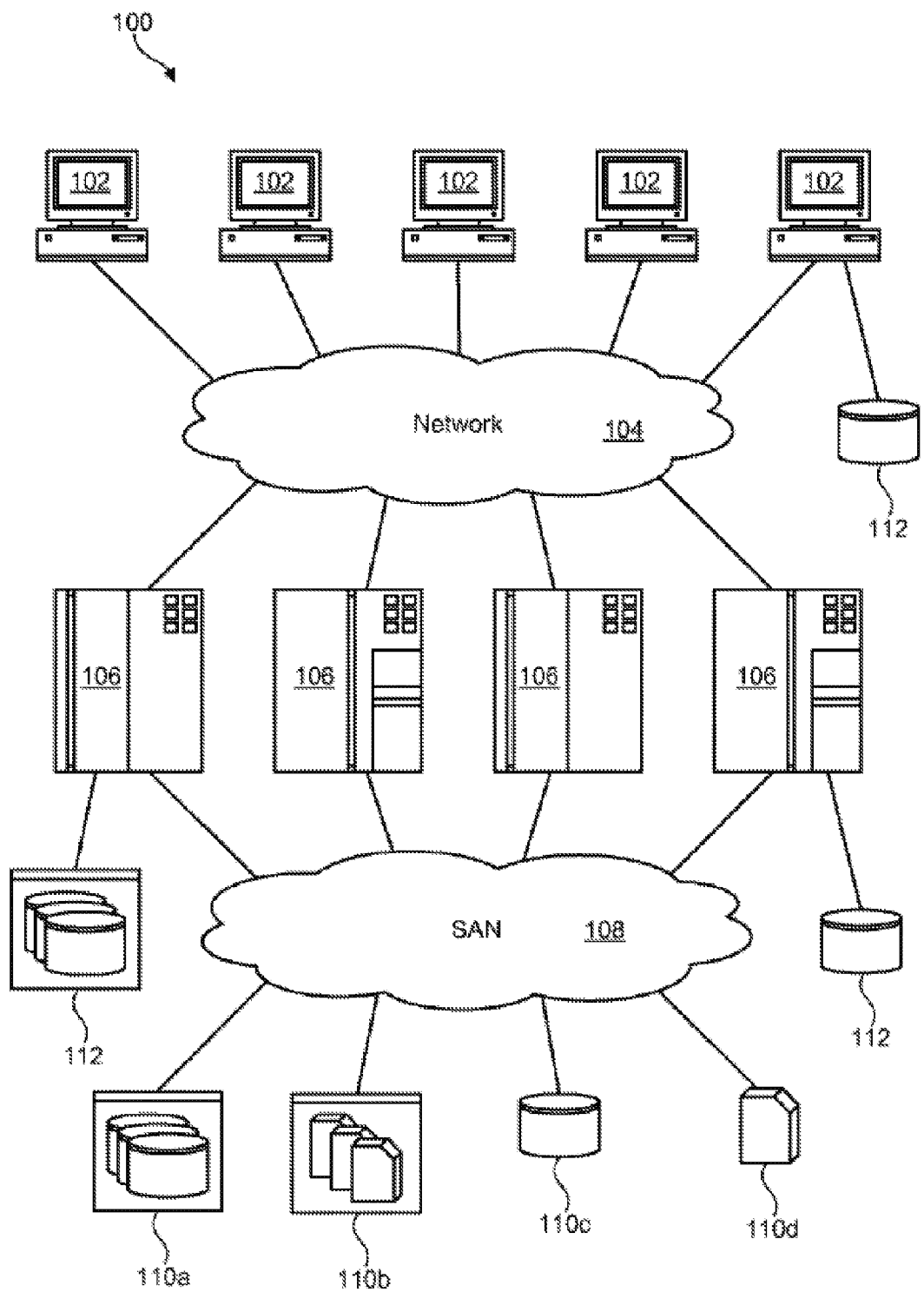
FIG. 1 illustrates an example network architecture according to embodiments.

Aspects of the disclosure relate to management efficiency in diagnosing error events related to storage. The methodology provides an identifier (e.g., unique instance identification) for memory allocation. When a memory allocation request is made, not only is the memory address returned, but also the unique instance identification for the memory allocation is returned. The unique instance identification is placed within the allocated virtual memory and is also separately maintained near the pointer as a second qualifier for this virtual storage area (e.g., by the allocator within another virtual memory structure or control block that points to the allocated virtual memory). The unique instance identification and data may be overwritten on reuse of the memory. When a significant system error occurs and a dump is taken, the diagnostician can determine if each pointer to the memory address is a valid reference by comparing the unique instance identification maintained near the pointer to the unique instance identification that is within the allocated virtual memory. The methodology may improve accuracy and timeliness in diagnosing causes of error events.

When a significant system error occurs, typically a dump (e.g., core dump, storage dump) of virtual memory is provided and a diagnostician attempts to determine the operating environment at the time of the error or crash. Often this involves analysis of the virtual memory areas and, specifically, the relationships between various virtual memory areas. These virtual memory areas can include many different types of structures (e.g., data areas, statistics, task processing meta-data, control blocks). The virtual memory area relationships may be implemented with a pointer (i.e., the virtual storage address of the virtual memory area). To illustrate, consider a chain of virtual storage control blocks of the same type, such as work items on a work queue, where these may be singly-linked with each control block containing a pointer to the next control block or doubly-linked with each control block pointing to both the next and previous control block of the same type. As another example, consider one distinct type of control block maintaining a pointer to another different type of control block. While there can be many causes for significant system errors due to logic or other programming mistakes, it should be noted that these also include common errors due to improper queuing and improper virtual storage management (e.g., de-allocation of memory while memory is still in use).

Any given memory address can have differing contents over time which can make it impossible within a dump to determine if a pointer to this address refers to the current contents or previous contents. As such, one control block may be allocated and de-allocated many times. The virtual storage area can be a suitable fit for the next allocation request; therefore, the exact same area of virtual memory may be used over and over for the exact same type of control block. In particular, a virtual memory area could be allocated and de-allocated multiple times per second; thus, the contents at a particular memory address could be, in effect, constantly changing.

A mechanism such as unique instance identification may assist in providing a determination as to whether the pointer is valid for the current contents at the virtual memory address. This is may help the diagnostician to determine the root cause of the error event quickly because there may be a system outage necessitating creation of a fix as quickly as possible to resume proper operations.

Aspects of the disclosure include a method and system for managing spaces in memory of a storage facility (i.e., storage system). The method and system may work on a number of operating systems. The method and system includes storing first and second identifiers in first and second spaces in memory in response to allocating the second space for a set of data. The first identifier is stored in a first field within the first space. The first space has a pointer in a second field. The pointer in the second field indicates an address of the second space. The second identifier is stored within a portion of the second space. Data may be overwritten on reuse of the memory which may occur zero or more times. In response to an error event, the first and second identifiers may be captured. A determination may be made as to whether the pointer is directed to the set of data. The determination can be based on a comparison of the first identifier and the second identifier.

Aspects of the disclosure include the first and second identifiers stored in the first and second spaces in memory being a same unique identifier. In embodiments, the first and second identifiers may be one precision timestamp related to one allocated set of data. In embodiments, the first and second identifiers may be one sequentially serialized value related to one allocated set of data. In embodiments, the second identifier may be included in a header. The header may have at least one of an eyecatcher, a version number, or a linkage.

Aspects of the disclosure may include finding the pointer is directed to a current set of data. Such finding may occur in response to determining the first identifier matches the second identifier. In embodiments, the first and second identifiers may be generated by a memory manager. In embodiments, the first and second identifiers may be generated by an application configured to selectively manage memory. The application may selectively decide to manage memory based on at least one feature. The feature may include, for example, a critical structure, a work element reused more than a threshold number of reuses, or a structure used in multithreaded operations only. Altogether, aspects of the disclosure may improve accuracy and timeliness in diagnosing causes of error events and provide benefits related to management efficiency.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems 110 (alternatively, remote systems or remote devices), such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

In embodiments, techniques of the disclosure may assist with error diagnosis related to data in the storage pools of storage systems 110, 112. Moreover, aspects of the disclosure such as unique instance identification may assist in providing a determination as to whether the pointer is valid for the current contents at a location (virtual memory address). Therefore, the methodology may provide benefits associated with increased efficiency (e.g., relatively quick diagnosis of an error event) in relation to the example network architecture 100 illustrated by FIG. 1.

Figure 2:
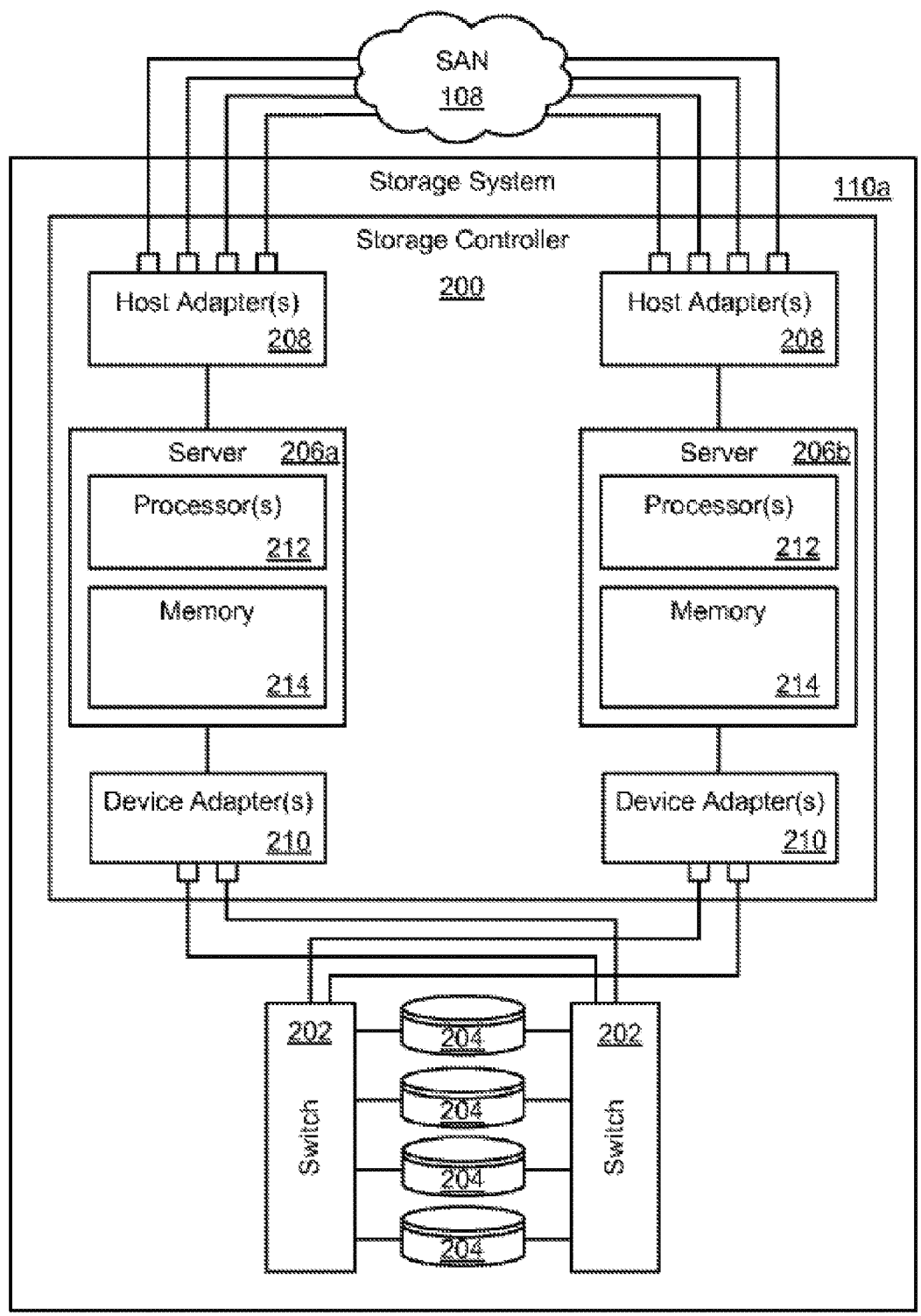
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In embodiments, techniques of the disclosure may assist with error diagnosis related to the memory 214 and/or the storage devices 204. Moreover, aspects of the disclosure such as unique instance identification may assist in providing a determination as to whether the pointer is valid for the current contents at a location (virtual memory address). Therefore, the methodology may provide benefits associated with increased efficiency (e.g., relatively quick diagnosis of an error event) in relation to the example storage system 110a containing an array of storage devices 204 and having the memory 214 illustrated by FIG. 2.

Figure 3:
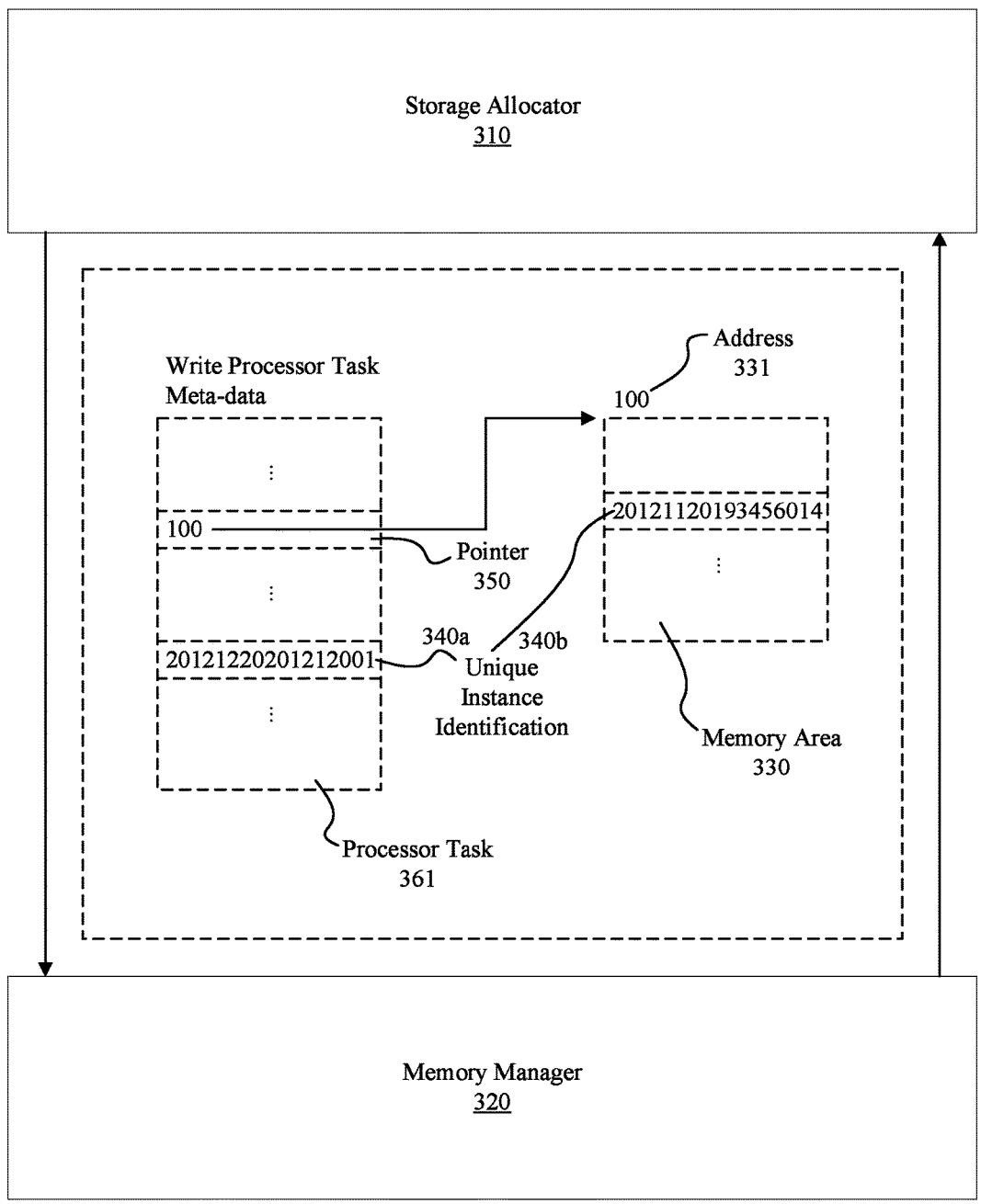
FIG. 3 depicts an example memory management system according to embodiments.

FIG. 3 depicts an example memory management system 300 according to embodiments. In embodiments, a storage allocator 310 makes a request of a memory manager 320 (e.g., to obtain a storage/memory area for a work control block (WKCB)). The memory manager 320 identifies a memory area 330 suitable to satisfy the request (e.g. based on size or other characteristics depending upon the implementation). The memory manager 320 also generates an unique instance identification 340 to be associated with this storage allocation request. In embodiments, the unique instance identification 340 can include usage of a sequentially increasing serialized value or a precision timestamp. The memory manager 320 may return (to the storage allocator 310) both an address 331 of the allocated memory area 330 and the unique instance identification 340.

The storage allocator 310 then places the unique instance identification 340b within the allocated memory 330 (in addition to normal initialization activities for the newly allocated memory such as setting the storage area to zeros or adding an eyecatcher). In embodiments, a header can be maintained within allocated storage areas to include values such as an eyecatcher, length, version number, linkage, etc. The unique instance identification 340b could also be included in the header at a well-known offset (although this is a not a requirement as the unique instance identification 340b could be placed anywhere within the allocated storage area). In embodiments, the memory manager 320 could prepend this unique instance identification 340b to the allocated memory 330 for a standardized and generalized solution. For each case that a pointer 350 is maintained to the allocated memory 330, the unique instance identification 340b is also maintained in a logical relationship with the pointer 350.

In embodiments, the WKCB (memory area 330) could include different types of requests (e.g., read, write, delete) that will be handled by the appropriate processing task 361 (e.g., Read Processor, Write Processor, Delete Processor). In certain cases the storage allocator 310 may also add additional meta-data regarding a request (e.g., write) to the WKCB (memory area 330) and provide it to the processor task 361 (e.g., Write Processor Task). Ultimately the processor task will prepare for work on the specific request. As part of the processor task meta-data, also maintained in a memory structure, the address of the work item and the unique instance identification 340a may be recorded.

For example, as the result of a programming or logic error, the memory at an address may de-allocated before work has been initiated for this work item. Subsequently, another allocator may make a request of the memory manager to obtain a storage area for another WKCB. Based on the characteristics (e.g. size) of this allocation request, the memory manager may identify that the storage area at the same address is suitable for this request and then generate another unique instance identification 340 to be associated with this specific storage allocation request. Both the storage address and the other unique instance identification 340 of are returned to the storage allocator. The storage allocator may then performs the normal initialization activities for the newly allocated memory (e.g., setting the storage area to zeros, adding an eyecatcher) as well as writing the unique instance identification 340b within the allocated storage at the same well known offset (e.g., the storage allocator initializes the work control block with meta-data for a read request).

Thus, in the example, within the processor task 361 (e.g., including Write Processor Task Meta-data), the address 331 of the work item (memory area 330) and the initial unique instance identification 340a are recorded. However, the initial unique instance identification 340a does not match the other unique instance identification 340b that is within the work item (memory area 330). In fact, the contents of the work item (memory area 330) appear to reflect a different request (e.g., a read request) which is not appropriate for the processor task 361 (Write Processor Task). An attempt (by the Write Processor) to perform a write operation unknowingly using the supplied meta-data for the read operation may result in a significant system error (e.g., storage protection event) that will ultimately produce a dump of storage.

When a significant system error occurs and a memory dump is produced, a comparison can be performed between the unique instance identification 340b in the allocated storage area to the unique instance identification 340a maintained with the pointer to the allocated storage. When these values are the same, the pointer 350 can be demonstrated as a valid pointer to the virtual storage area. When these values are different, the pointer 350 can be demonstrated as an invalid pointer.

Analytics of the storage areas and their relationships may be performed (e.g., by a user). It can be quickly determined that the virtual storage address recorded within the Write Processor Task Meta-data is not a valid pointer since the unique instance identification 340a recorded within the Write Processor Task Meta-data does not match the unique instance identification 340b within the virtual storage. In fact, a prior instance of virtual storage contents may be present at the address. In sum, the approach in FIG. 3 uses an efficient amount of overhead with unique instance identification. The unique instance identification is kept near the pointer (e.g., conveniently located so as to, for example, not require a separate look-up, but not not within the pointer or immediately adjacent to the pointer). The unique instance identification is stored within the allocated memory. The approach allows for subsequent comparison (e.g., by a user such as a diagnostician) of application memory areas regarding the occurrences of the unique instance identification.

Figure 4:
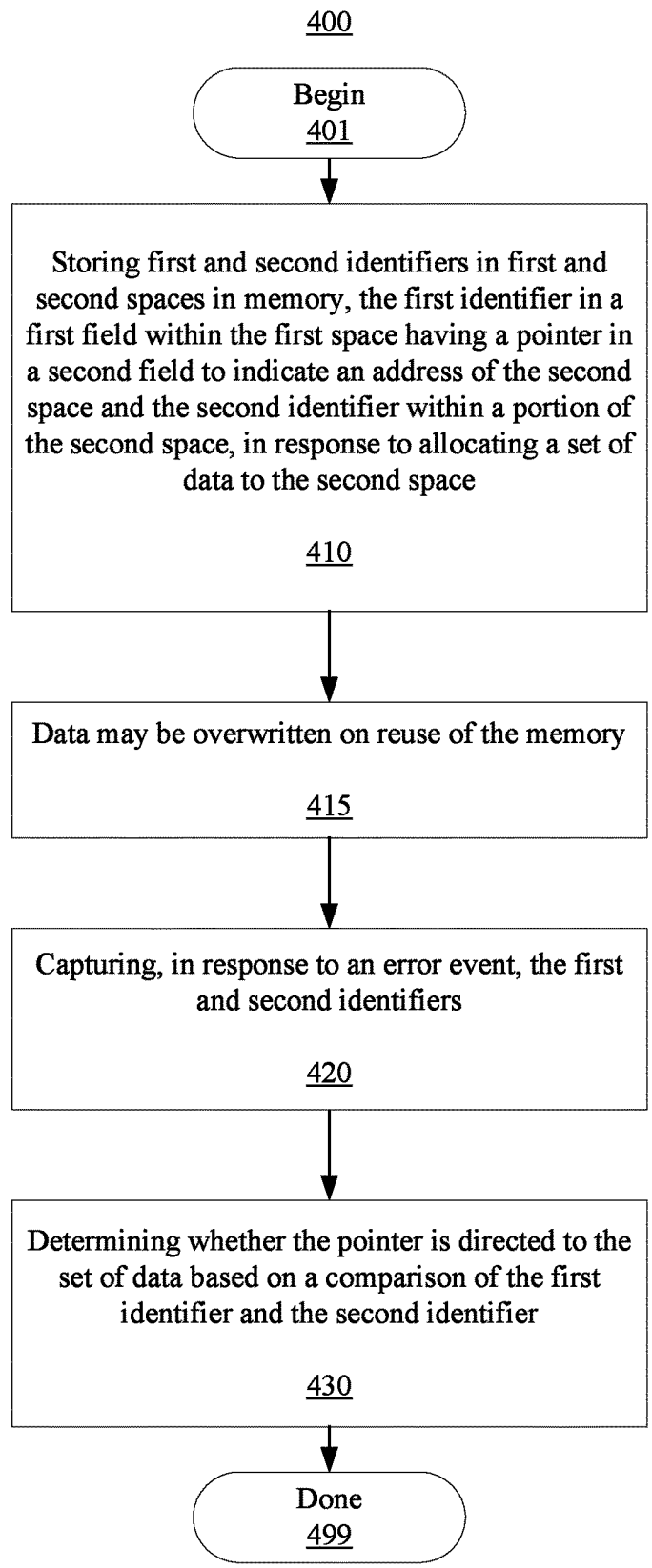
FIG. 4 is a flowchart illustrating a method for managing spaces in memory of a storage system according to embodiments.

FIG. 4 is a flowchart illustrating a method 400 for managing spaces in memory of a storage system according to embodiments. Method 400 may work on a number of operating systems. Method 400 begins at block 401. At block 410, first and second identifiers are stored in first and second spaces in memory in response to allocating the second space for a set of data. The first identifier is stored in a first field within the first space. The first space has a pointer in a second field. Maintaining the first identifier separate from the pointer improves overhead efficiency in managing normal usage of the pointer. The pointer in the second field indicates an address of the second space. The second identifier is stored within a portion of the second space. Thus, it is stored within a memory area and separate from the pointer. Storing it within the memory area provides efficiency in diagnostic operations because of a lesser strain on knowledge of memory management processing and control structures.

In embodiments, the first and second identifiers stored in the first and second spaces in memory may be a same unique identifier. The first and second identifiers could be the same in that they are identical values. The first and second identifiers could be unique in that duplication or reuse will not occur for the life of the operating environment. In embodiments, the first and second identifiers may be unique in that they may be one precision timestamp (e.g., to at least a fraction of a second) related to one allocated set of data. In embodiments, the first and second identifiers may be unique in that they may be one sequentially serialized value (e.g., starting at zero and adding one in order to progress toward infinity) related to one allocated set of data. In embodiments, the second identifier may be included in a header. The header may have at least one of an eyecatcher (e.g., a sequence of bytes with a low probability of randomly occurring), a version number (e.g., pertaining to versions of data), or a linkage (e.g., a relationship for work items such as linked control blocks).

In embodiments, the first and second identifiers may be generated by a memory manager. In embodiments, the first and second identifiers may be generated by an application configured to selectively manage memory. The application may selectively decide to manage memory based on at least one feature. The feature may include, for example, a critical structure, a work element reused more than a threshold number of reuses, or a structure used in multithreaded operations only. The methodology can be deployed in a programming language or system that uses a pointer-based architecture.

Data may be overwritten on reuse of the memory at block 415. Overwriting may occur zero or more times. Thus, contents of the memory (including those stored at block 410) may change. For example, one control block may be allocated and de-allocated many times. The virtual storage area can be a suitable fit for the next allocation request; therefore, the exact same area of virtual memory may be used over and over for the exact same type of control block. In particular, a virtual memory area could be allocated and de-allocated multiple times per second; thus, the contents at a particular memory address could be, in effect, constantly changing.

In response to an error event, the first and second identifiers may be captured at block 420. The first and second identifiers may be captured as part of a dump (core dump, storage dump) of virtual memory. Contents of the memory (including identifiers) may be left unchanged. Examples of error events include logic, other programming mistakes, improper queuing, and improper virtual storage management (e.g., de-allocation of memory while memory is still in use). In embodiments, errors may be detected after they occur (e.g., running an error detection mechanism at a given time interval such as hourly). For example, diagnosis is possible for the type of errors that can occur in a multi-processing environment when a storage area can be erroneously freed before all references to the area have been made; when this reference occurs and results in a core dump, it can be seen that a most recent unique instance identification within the now unallocated memory area was the intended memory area to be referenced, but has been erroneously freed in advance of the reference. Therefore, overhead may be lesser using method 400 relative to a methodology actively detecting errors in an ongoing manner.

At block 430, a determination may be made as to whether the pointer is directed to the set of data. The determination can be based on a comparison of the first identifier and the second identifier (i.e., the unique instance identification associated with a pointer that had been returned to a storage allocator and the other unique instance identification associated with a memory location). The determination may at least assist in deciding whether the pointer is valid for the current contents at the virtual memory address. In embodiments, the method may include finding the pointer is directed to a current set of data (e.g., most recent version, data most recently written). Such finding may occur in response to determining the first identifier matches the second identifier (e.g., identical values or set of values). Deciding whether the pointer is valid may help the diagnostician to determine the root cause of the error event quickly because there may be a system outage necessitating creation of a fix as quickly as possible to resume proper operations.

Method 400 may conclude at block 499. Aspects of method 400 may improve accuracy and timeliness in diagnosing causes of error events. Historical occurrences may be reconstructed effectively and efficiently. Altogether, method 400 may provide benefits related to management efficiency of the storage system.

Figure 5:
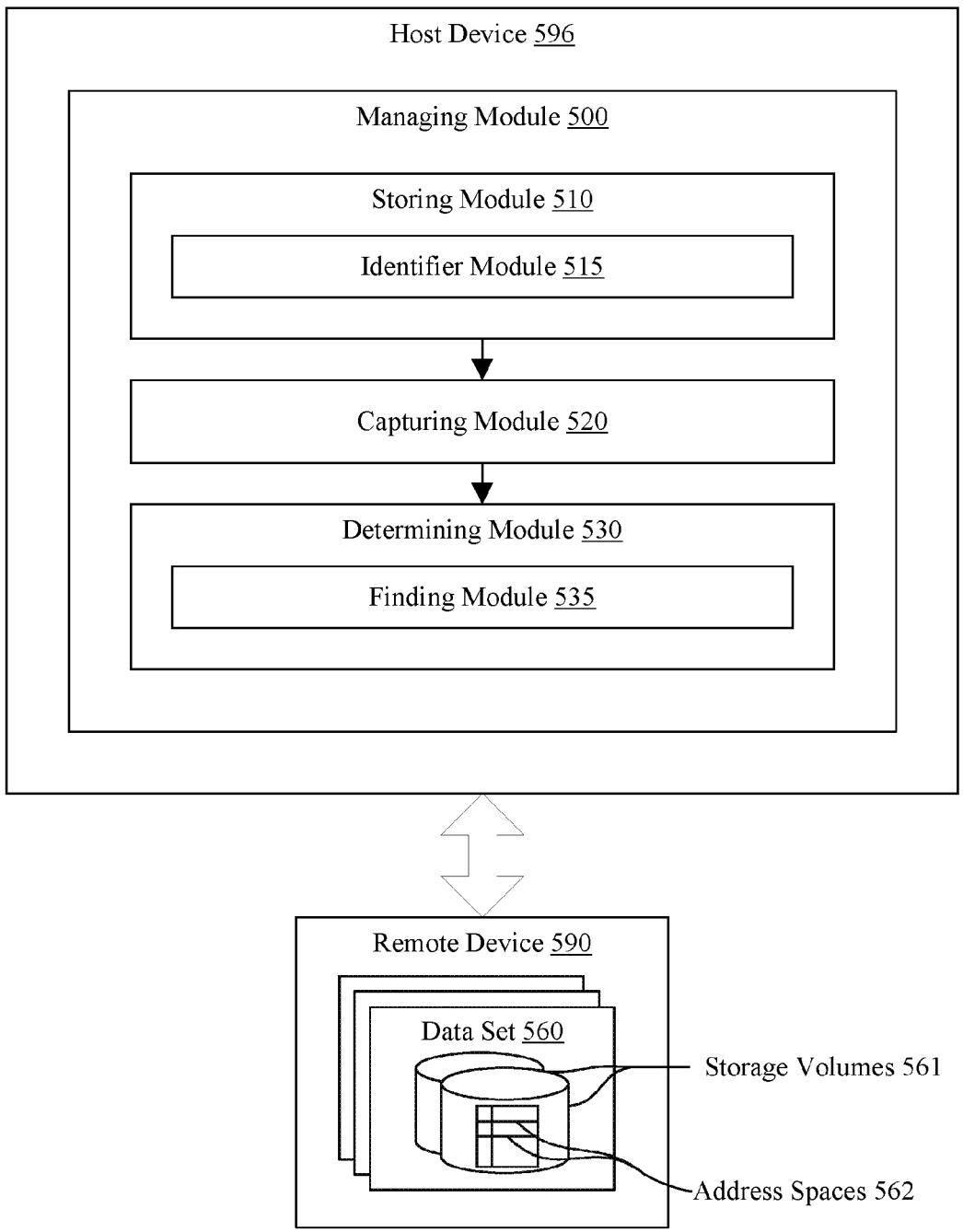
FIG. 5 shows modules of a system for managing spaces in memory of a storage facility according to embodiments.

FIG. 5 shows modules of a system for managing spaces in memory of a storage facility according to embodiments. In embodiments, method 400 may be implemented using one or more modules of FIG. 5. These modules may be implemented in hardware, software or firmware executable on hardware, or a combination thereof. For example, module functionality that may occur in a host device 596 may actually be implemented in a remote device 590 and vice versa. Other functionality may be distributed across the host device 596 and the remote device 590.

The host device 596 may include a managing module 500. The managing module 500 may be configured and arranged to manage a storage facility. The managing module 500 may include a storing module 510, a capturing module 520, and a determining module 530. The storing module 510 may have an identifier module 515. The determining module 530 may have a finding module 535. The remote device 590 may have a data set 560 comprising storage volumes 561 having address spaces 562.

The storing module 510 stores first and second identifiers in first and second spaces in memory in response to allocating the second space for a set of data. The first identifier is stored in a first field within the first space. The first space has a pointer in a second field. The pointer in the second field indicates an address of the second space. The second identifier is stored within a portion of the second space.

In embodiments, the identifier module 515 selects elements of the first and second identifiers. In embodiments, the first and second identifiers stored in the first and second spaces in memory may be a same unique identifier. The first and second identifiers could be the same in that they are identical values. In embodiments, the first and second identifiers may be unique in that they may be one precision timestamp related to one allocated set of data. In embodiments, the first and second identifiers may be unique in that they may be one sequentially serialized value related to one allocated set of data. In embodiments, the second identifier may be included in a header. The header may have at least one of an eyecatcher, a version number, or a linkage. In embodiments, the first and second identifiers may be generated by a memory manager. In embodiments, the first and second identifiers may be generated by an application configured to selectively manage memory. The application may selectively decide to manage memory based on at least one feature. The feature may include, for example, a critical structure, a work element reused more than a threshold number of reuses, or a structure used in multithreaded operations only.

In response to an error event, the capturing module 520 may capture the first and second identifiers. The first and second identifiers may be captured as part of a dump (core dump, storage dump) of virtual memory. Examples of error events include logic, other programming mistakes, improper queuing, and improper virtual storage management (e.g., de-allocation of memory while memory is still in use).

The determining module 530 may determine whether the pointer is directed to the set of data. The determination can be based on a comparison of the first identifier and the second identifier. The determination may at least assist in deciding whether the pointer is valid for the current contents at the virtual memory address. In embodiments, the finding module 535 may find the pointer is directed to a current set of data. Such finding may occur in response to determining the first identifier matches the second identifier. Deciding whether the pointer is valid may help the diagnostician to determine the root cause of the error event quickly because there may be a system outage necessitating creation of a fix as quickly as possible to resume proper operations.

Aspects of managing module 500 may improve accuracy and timeliness in diagnosing causes of error events. Altogether, a storage system may be managed more efficiently. In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A system comprising:
a processor; and
a memory in communication with the processor, the memory containing program instructions that, when executed by the processor, are configured to cause the processor to perform a method, the method comprising:
detecting, by a processor, a request to allocate a first space in a first memory for a set of data;
creating, by the processor, a first copy of a timestamp identifier and a second copy of the timestamp identifier, wherein the first and second copies of the timestamp identifier hold information related to data allocation that is precise to a fraction of a second, wherein the timestamp identifier is unique in that no further copies are created for the life of the operating environment, and wherein the first copy of the timestamp identifier and the second copy of the timestamp identifier are identical at the time of their creation;
storing, by the processor and in response to the detecting the request, the first copy of the timestamp identifier in a header in the first space at a predetermined offset from an eyecatcher;
storing, by the processor and in response to the detecting the request, a pointer to the first space in a second space in a second memory;
storing, by the processor and in response to the detecting the request, the second copy of the timestamp identifier in the second space in the second memory, wherein the second copy is stored sufficiently close to the pointer such that both the pointer and the second copy of the timestamp are both retrievable with one look-up, but such that the second copy of the timestamp is not stored within or immediately adjacent to the pointer;
detecting, by the processor running an hourly error-detection mechanism, an improper-virtual-storage-management error;

performing, by the processor and in response to the detecting the improper-virtual-storage-management error, a storage dump that includes a dump of the first space in memory and the second space in memory, wherein the contents of the first space in memory and the second space of the memory are not changed by the storage dump;

comparing, by the processor, the first copy of the timestamp identifier and the second copy of the timestamp identifier to determine whether they remain identical;

determining, by the processor and in response to the comparing, that the first copy of the timestamp identifier differs from the second copy of the timestamp identifier; and concluding, by the processor and in response to the determining, that the pointer is an invalid pointer.

* * * * *